JOHN W. TALLMADGE.
Improvement in Scaffold Brackets for Roofing.
No. 114,365. Patented May 2, 1871.
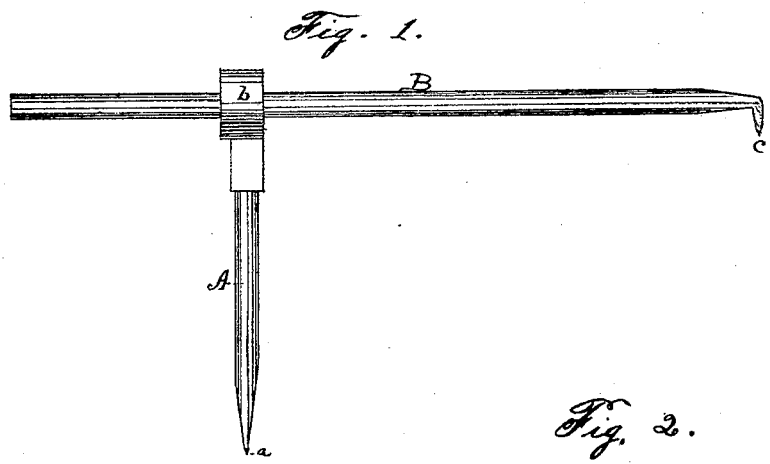
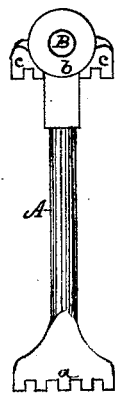
Witnesses.
R. Porter
C. B. Oldershaw
Inventor.
John W. Tallmadge.
By James Shepard atty.

United States Patent Office.

JOHN W. TALLMADGE, OF PLAINVILLE, CONNECTICUT.

Letters Patent No. 114,365, dated May 2, 1871; antedated April 22, 1871.

IMPROVEMENT IN SCAFFOLD-BRACKETS FOR ROOFING.

The Schedule referred to in these Letters Patent and making part of the same.

I, JOHN W. TALLMADGE, of Plainville, in the county of Hartford and State of Connecticut, have invented a new and improved Scaffold-Bracket for Roofing, of which the following is a specification.

My invention consists of a bracket provided with a pointed upright and a hooked bracket which passes through a socket near the upper end of the upright, whereby the bracket is adjusted as hereinafter described.

In the accompanying drawing—

Figure 1 is a side elevation of a bracket of my invention, and

Figure 2 a front elevation of the same.

A designates the upright, which is pointed at $a$, and, if desired, may be bifurcated to form lateral braces.

$b$ is the head of the upright A, in which head $b$ is a socket of a shape and size corresponding with that of the body of the bracket B, so that the same may be readily passed back and forth through said socket.

One end of the bracket B is provided with hooked point or points $c$, and, like the upright A, may be bifurcated, if desired.

The body of the upright A and bracket B may be round, square, or rectangular, the latter of which is preferable.

To use this bracket the pointed end $a$ of the upright A is placed upon the roof when the bracket B is slipped through the socket in the head $b$ until the hooked point $c$ rests on the roof in the position desired, when the points are driven into said roof and the bracket is ready to receive the scaffold.

It will be readily observed that, by adjusting the bracket through the socket-head $b$, it is adapted to roofs of different angles.

If desired, a set-screw or other fastening may be used to secure the bracket A in the head $b$, but it is believed to be perfectly secure to use without any such device.

The advantages of my invention are, that it is simple, durable, convenient; that it can be made at a very small cost; and that the upright can always be set in a vertical position upon roofs of various angles.

I claim as my invention—

The herein-described roofing-bracket, consisting of the upright A, socket-head $b$, and adjustable bracket B, all combined and operating together, substantially as and for the purpose described.

JOHN W. TALLMADGE.

Witnesses:
R. S. PORTER,
C. B. OLDERSHAW.